United States Patent [19]

Harada et al.

[11] Patent Number: 5,312,724
[45] Date of Patent: May 17, 1994

[54] SILVER HALIDE PHOTOGRAPHIC PHOTOSENSITIVE MATERIALS

[75] Inventors: Toru Harada; Kiyoshi Kawai, both of Kanagawa, Japan

[73] Assignee: Fuji Photo Film Co., Ltd., Kanagawa, Japan

[21] Appl. No.: 61,008

[22] Filed: May 14, 1993

[30] Foreign Application Priority Data

May 18, 1992 [JP] Japan .................. 4-148897

[51] Int. Cl.$^5$ .................. G03C 1/815; G03C 1/825
[52] U.S. Cl. .................. 430/522; 430/507; 430/510; 430/517
[58] Field of Search .............. 430/522, 517, 510, 507

[56] References Cited

U.S. PATENT DOCUMENTS 5,075,205 12/1991 Inagaki et al. .................. 430/522
5,108,883  4/1992 Matejec et al. .................. 430/522

FOREIGN PATENT DOCUMENTS 50-100116  8/1975 Japan .
62-3250    1/1987 Japan .
2-259753  10/1990 Japan .

Primary Examiner—Charles L. Bowers, Jr.
Assistant Examiner—Geraldine Letscher
Attorney, Agent, or Firm—Sughrue, Mion, Zinn, Macpeak & Seas

[57] ABSTRACT

Disclosed is a silver halide photographic photosensitive material comprising a support having thereon a layer which contains at least one dye represented by general formula (I):

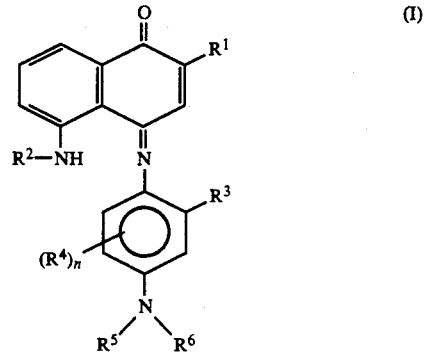

wherein, $R^1$ represents a hydrogen atom, a halogen atom, a sulfonic acid group, a carboxylic acid group or a CONHR, $SO_2NHR$, $NHSO_2R$, NHCOR or NHCONHR group (where R is an alkyl group, an aryl group or a heterocyclic group); $R^2$ represents a group represented by $SO_2R$, COR or CONHR (where R has the same significance as before); $R^3$ and $R^4$ are the same or different, and each represents a hydrogen atom, an alkyl group, an alkoxy group, a hydroxy group, an amino group or a halogen atom; $R^5$ and $R^6$ are the same or different, and each represents an alkyl group, an aryl group, an acyl group or a sulfonyl group; $R^5$ and $R^6$ may be joined together to form a five or six membered ring; $R^5$ and $R^6$ may be joined with the adjacent $R^4$ respectively to form five or six membered rings; n represents an integer of value 0 to 3; provided that there are at least three acidic substituent groups within the dye.

7 Claims, No Drawings

SILVER HALIDE PHOTOGRAPHIC PHOTOSENSITIVE MATERIALS

FIELD OF THE INVENTION

This invention concerns silver halide photographic photosensitive materials which have hydrophilic colloid layers which have been colored. More precisely, it concerns silver halide photographic photosensitive materials which have a hydrophilic colloid layer containing dyes which absorb in the infrared region. These dyes exist in a stable manner in the photographic material, are photographically inert and are readily decolored in the course of photographic processing.

BACKGROUND OF THE INVENTION

The photographic emulsion layers or other layers in a silver halide photographic photosensitive material are often colored so that they absorb light of a specified wavelength.

A colored layer can be formed on the side further from the support than the photosensitive photographic emulsion layer, where it is necessary to control the spectral composition of the light which falls on the photographic emulsion layer. Such a colored layer is known as a filter layer. In cases where there is a plurality of photographic emulsion layers, as in the case of a multi-layer color photosensitive material, filter layers are also established between these emulsion layers.

Light which has been scattered when passing through a photographic emulsion layer or after transmission is reflected at the boundary between the emulsion layer and the support or at the surface of the support on the opposite side from the emulsion layer. In this case, a colored layer can be formed between the photographic emulsion layer and the support or on the opposite side of the support from the photographic emulsion layer to prevent blurring of the image caused by such scattered light. In other words, the occurrence of halation due to this light re-entering the photographic emulsion layer may be prevented. Such a colored layer is know as an anti-halation layer. Anti-halation layers are also located between the emulsion layers in multi-layer color photosensitive materials.

Photographic emulsion layers can also be colored in order to prevent the loss of image sharpness which is due to the scattering of light within the photographic emulsion layer (this phenomenon is generally known as irradiation).

On the other hand, in recent years, recording materials have been proposed which have been sensitized to infrared wavelengths, which is to say recording materials on which the output of a near infrared laser is recorded. For example, the method of forming an image with a so-called scanner system, in which the original is scanned and a silver halide photographic photosensitive material is exposed on the basis of the image signal and a negative image or a positive image corresponding to the original is formed, is known as one method of exposing such a photographic photosensitive material. With this method the use of a semiconductor laser as the recording light source in the scanner system is most desirable. Semiconductor lasers are advantageous in that they are small and cheap, they are readily modulated, they have a longer life than He-Ne lasers and argon lasers for example, and they generate light in the infrared region. If a photosensitive material which is sensitive to the infrared region is used, there is the further advantage that the handling operability is improved since it is possible to make use of a bright safelight.

However, the oscillating wavelength of a semiconductor laser is in the red to infrared range. Thus, a need for sensitive materials which are highly photosensitive to the red to infrared region has arisen.

Sensitizing dyes for spectral sensitization in this region are such that the wavelength dependence of the spectral sensitivity is generally broad. Thus, it is difficult to photosensitize selectively the individual photosensitive layers in a photosensitive material which has a plurality of layers to different laser lights, and color separation is poor.

Moreover, when exposures are made using high density light, such as laser light, of a long wavelength in the red to infrared region, the spreading of the light due to halation and irradiation is pronounced. This causes a marked deterioration in resolution.

Colored layers can be used to prevent the deterioration in color separation and resolution. Since the layers which should be colored are often comprised of hydrophilic colloid, a water soluble dye is generally included in the layer for the purpose of coloration. These dyes must satisfy conditions such as those indicated below:

(1) they must have the proper spectral absorption corresponding to the intended use;
(2) they must be photographically inert. Thus, they must have no deleterious effect in a chemical sense on the performance of the silver halide photographic emulsion layer, which is to say that they should not reduce photographic speed, cause fading of the latent image, or cause fogging;
(3) they should be decolored or dissolved out in the course of photographic processing and leave no deleterious coloration in the photographic photosensitive material after processing; and
(4) they should have excellent storage stability in solution or in photographic materials.

There are many conventional dyes which absorb visible light or ultraviolet light and which satisfy these conditions. They are suitable for improving images in conventional photographic elements which are sensitized to wavelengths of 700 nm and below. The triarylmethane and oxonol dyes in particular are widely used in this connection.

In the past, much effort has been made to discover dyes which satisfy the aforementioned conditions, and many dyes have been suggested.

For example, there are the tricarbocyanine dyes disclosed in JP-A-62-123454, JP-A-63-55544 and JP-A-64-33547, the oxonol dyes disclosed in JP-A-1-227148, the merocyanine dyes disclosed in JP-A-1-234844, the tetraaryl type polymethine dyes disclosed in JP-A-2-216140 and the indoaniline dyes disclosed in JP-A-50-100116, JP-A-62-3250 and JP-A-2-259753. (The term "JP-A" as used herein signifies an "unexamined published Japanese patent application".)

However, there are still very few dyes which can satisfy all the aforementioned conditions. Hence, there are few excellent photosensitive materials which have a high photosensitivity in the infrared region, which have good color separation, and in which halation and irradiation are prevented. Thus, at the present time, it is impossible to realize satisfactorily the characteristics of the semiconductor lasers which have an excellent performance as described above.

SUMMARY OF THE INVENTION

One object of the present invention is to provide infrared photosensitive silver halide photographic photosensitive materials which contain dyes which satisfy the aforementioned conditions (1), (2), (3) and (4), which have excellent photographic characteristics, which have good stability, and with which there is no deleterious residual coloration after processing.

This and other objects of the invention has been realized with a silver halide photographic photosensitive material which contains at least one dye represented by general formula (I) shown below:

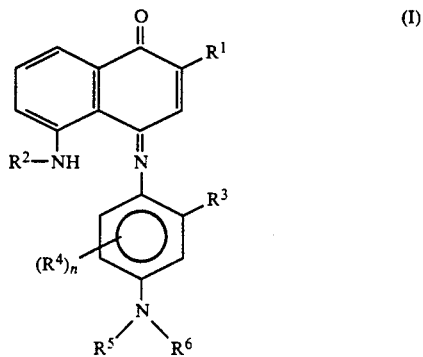

In this formula, $R^1$ represents a hydrogen atom, a halogen atom, a sulfonic acid group, a carboxylic acid group or a CONHR, $SO_2NHR$, $NHSO_2R$, NHCOR or NHCONHR group (where R is an alkyl group, an aryl group or a heterocyclic group); and $R^2$ represents a $SO_2R$, COR or CONHR group (where R has the same significance as above). $R^3$ and $R^4$ may be the same or different, and each represents a hydrogen atom, an alkyl group, an alkoxy group, a hydroxy group, an amino group or a halogen atom; $R^5$ and $R^6$ may be the same or different, and each represents an alkyl group, an aryl group, an acyl group or a sulfonyl group; and $R^5$ and $R^6$ may be joined together to form a five or six membered ring. Furthermore, $R^5$ or $R^6$ may be joined with the adjacent $R^4$ to form five or six membered rings. Moreover, n represents an integer of value 0 to 3. Further, there are at least three acidic substituent groups within the dye molecule.

DETAILED DESCRIPTION OF THE INVENTION

General formula (I) is described in detail below. The halogen atoms represented by $R^1$, $R^3$ and $R^4$ are F, Cl or Br.

R in the groups CONHR, $SO_2NHR$, $NHSO_2R$, NHCOR and NHCONHR which can be represented by $R^1$, represents an alkyl group, an aryl group or a heterocyclic group. The alkyl groups are preferably alkyl groups having a carbon number of 1 to 5 (for example methyl, ethyl, propyl, butyl). They may have substituent groups (for example, sulfonic acid group, carboxylic acid group, hydroxy group). The aryl groups are preferably phenyl groups or naphthyl groups, and these may be substituted with sulfonic acid groups, carboxylic acid groups, hydroxy groups, halogen atoms (F, Cl, Br), alkoxy groups having a carbon number of 1 to 5 (for example, methoxy, ethoxy) or amino groups (for example, dimethylamino, di-4-sulfobutylamino, dicarboxymethylamino). The heterocyclic groups are preferably pyridine rings, 1,3-thiazole rings, 1,3,4-triazole rings, benzothiazole rings, benzimidazole rings, benzoxazole rings, 1,2,4-thiadiazole rings or similar rings. They may be substituted with sulfonic acid groups, carboxylic acid groups, hydroxy groups, methyl groups, methoxy groups, halogen atoms (F, Cl, Br) or the like.

Moreover, the R groups of the $SO_2R$, COR or CONHR groups represented by $R^2$ are the same as those described above for $R^1$. Furthermore, the R groups preferably include acidic substituent groups.

An acidic substituent group in the present invention signifies a sulfonic acid group, a carboxylic acid group, a phosphonic acid group, $SO_2NHSO_2R$ or $CONHSO_2R$ (where the same significance as above). A sulfonic acid group signifies a sulfo group or a salt thereof, a carboxylic acid group signifies a carboxyl group or a salt thereof, and a phosphonic acid group signifies a phospho group or a salt thereof. Furthermore, an $SO_2NHSO_2R$ or $CONHSO_2$ group may also encompass the form of a salt. Examples of such salts include alkali metal salts such as Na and K salts, ammonium salts and organic ammonium salts such as triethylammonium, tributylammonium, pyridinium and tetrabutylammonium salts.

The alkyl groups which can be represented by $R^3$, $R^4$, $R^5$ and $R^6$ are the same as those described above for R. Di-4-sulfobutylamino and dicarboxymethylamino groups, for example, can be cited as amino groups which can be represented by $R^3$ and $R^4$. The alkoxy groups represented by $R^3$ and $R^4$ preferably have a carbon number of 1 to 5. They may be substituted with sulfonic acid groups or carboxylic acid groups (for example, 4-sulfobutoxy, carboxymethoxy).

The aryl groups represented by $R^5$ and $R^6$ are the same as those described above for R. An acetyl group and a propionyl group can be cited, for example as acyl groups, and a methanesulfonyl group and an ethanesulfonyl group can be cited, for example, as sulfonyl groups. The acyl group and the sulfonyl group have a carbon number of 1 to 4, preferably 1 to 2. Furthermore, $R^5$ and $R^6$ may be joined together to form, for example, a pyrrolidine ring, a piperidine ring or a morpholine ring.

Furthermore, $R^5$ and $R^6$ may be joined with the adjacent $R^4$ to form, for example, a durolidine ring or a tetrahydroquinoline ring.

At least three of the aforementioned acidic substituent groups are included in the dye molecule.

More desirably, the objects of the invention can be realized with a silver halide photographic photosensitive material which has a hydrophilic colloid layer which contains at least one dye according to general formula (I), in which $R^1$ is a CONHR group (where R represents an alkyl group, an aryl group or a heterocyclic group), $R^4$ is a hydrogen atom, and $R^5$ and $R^6$ are alkyl groups. (Each substituent group is the same as described above.)

Moreover, the inclusion of at least four, and preferably at least five, acidic substituent groups in the dye molecule is desirable. More specifically, the inclusion is preferably 4 to 10, more preferably 4 to 6 in the dye molecule.

It is especially desirable that at least two of acidic groups which are included in the dye molecule are carboxylic acid groups. Further, the dye may conprise at least four carboxylic acid groups or at least five carboxylic acid groups.

Examples of dyes represented by general formula (I) in the present invention are shown below, but the scope of the invention is not limited to these examples:

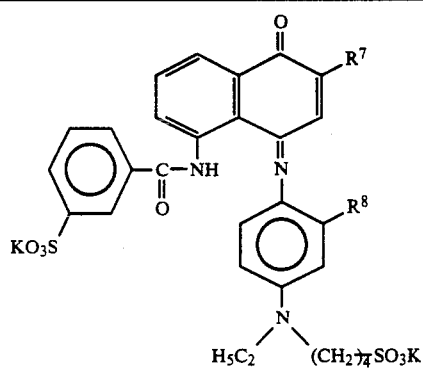

| Compound | $R^7$ | $R^8$ |
|---|---|---|
| I-1 | CONH—⟨⟩—SO$_3$K | OCH$_3$ |
| I-2 | CONH—⟨SO$_3$K⟩—SO$_3$K | OCH$_3$ |
| I-3 | " | CH$_3$ |
| I-4 | " | NHCOCH$_3$ |
| I-5 | " | H |

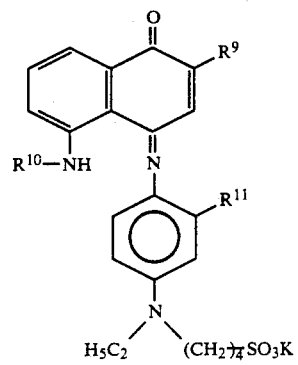

| Compound | $R^9$ | $R^{10}$ | $R^{11}$ |
|---|---|---|---|

-continued

| Compound | | | |
|---|---|---|---|
| I-6 | 4-(NHCONH-)-benzene-1,3-di-SO$_3$K | 5-SO$_2$-benzene-1,3-di-CO$_2$K | OCH$_3$ |
| I-7 | 4-(NHSO$_2$-)-benzene-1,3-di-CO$_2$K | " | " |
| I-8 | 6-(CONH-)-pyridine-3-SO$_3$K | 3-SO$_2$-benzene-1-SO$_3$K | OCH$_3$ |
| I-9 | SO$_3$K | " | O(CH$_2$)$_4$SO$_3$K |
| I-10 | CO$_2$K | " | " |

| Compound | R$^{12}$ | R$^{13}$ | R$^{14}$ |
|---|---|---|---|
| I-11 | CONH(CH$_2$)$_2$SO$_3$K | 4-[N(CH$_2$CH$_2$CH$_2$CH$_2$SO$_3$K)$_2$]-2-[O(CH$_2$)$_4$SO$_3$K]-phenyl | 3-SO$_2$-benzene-1-SO$_3$K |
| I-12 | 3-(CONH-)-benzene-1-SO$_3$K | 4-[N(CH$_2$CO$_2$K)$_2$]-2-OCH$_3$-phenyl | 3-CO-benzene-1-SO$_3$K |
| I-13 | " | 4-[N(CH$_2$CH$_2$CH$_2$CH$_2$SO$_3$K)$_2$]-2-OCH$_3$-phenyl | SO$_2$CH$_3$ |
| I-14 | " | " | 3-SO$_2$-benzene-1,5-di-CO$_2$K |
| I-15 | " | " | 3-CO-benzene-1-SO$_3$K |

-continued
| | | |
|---|---|---|
| I-16 | 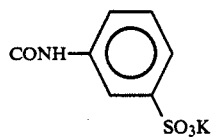 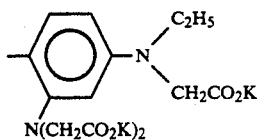 | $SO_2CH_3$ |
| I-17 | 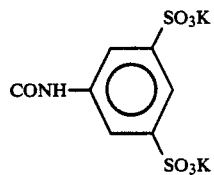 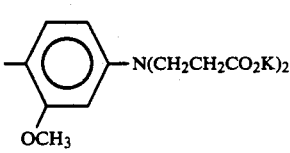 | $SO_2CF_3$ |
| I-18 | 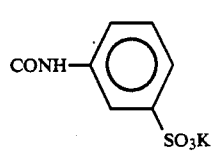 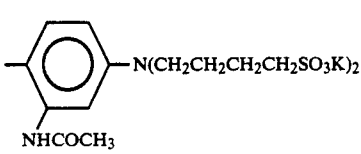 |  |
| I-19 | 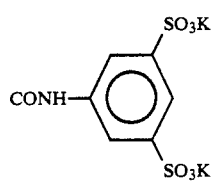 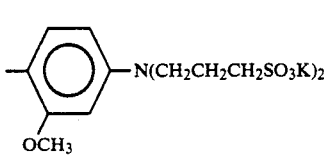 | 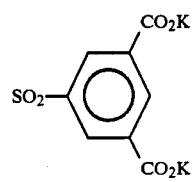 |
| I-20 | 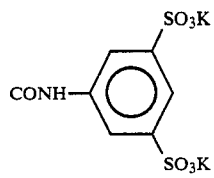 " | 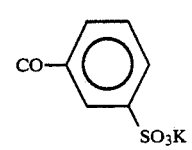 |
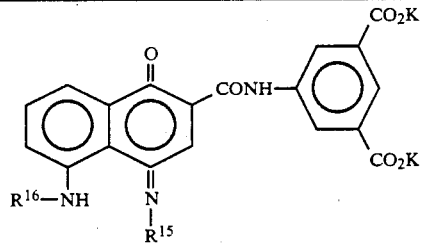
| Compound | $R^{15}$ | $R^{16}$ |
|---|---|---|
| I-21 | 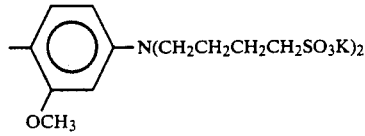 | 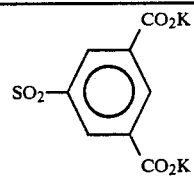 |
| I-22 | " | 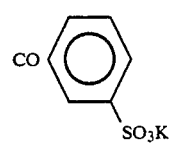 |
| I-23 | " | 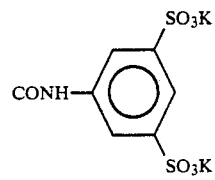 |

-continued
| | | |
|---|---|---|
| I-24 | " | $CH_2SO_3K$ |
| I-25 | 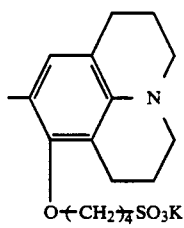 | 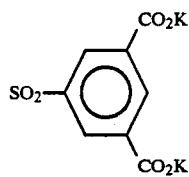 |
| I-26 | 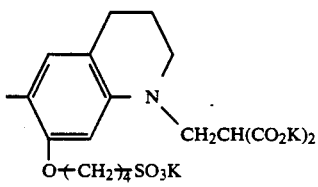 | 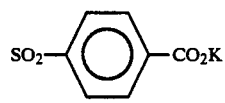 |
| I-27 | 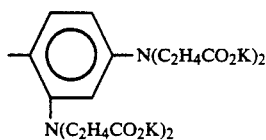 | " |
| I-28 | " | 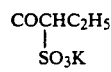 |
| I-29 | 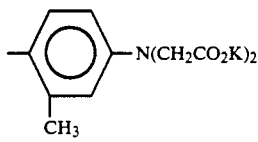 | 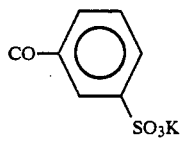 |
| I-30 | 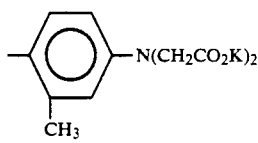 | " |
| I-31 | 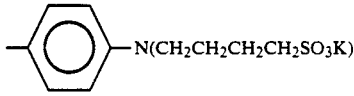 | " |
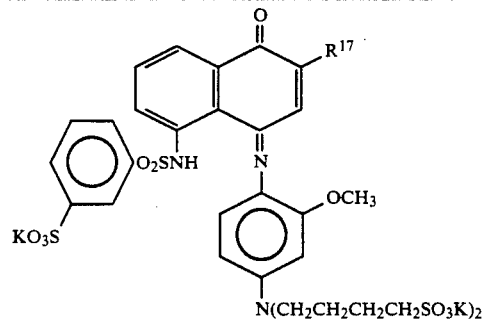
| Compound | $R^{17}$ |
|---|---|
| I-32 | 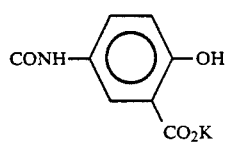 |

| | |
|---|---|
| I-33 | 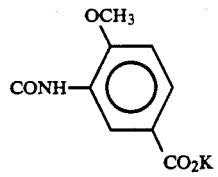 |
| I-34 | 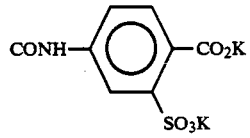 |
| I-35 | 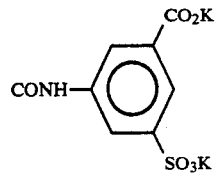 |
| I-36 | 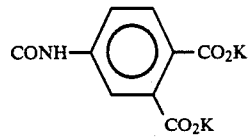 |

The compounds of the present invention can be prepared with reference to JP-A-50-100116, JP-A-62-3250 and JP-A-2-129268 for example.

Examples of their preparation are described below.

Preparation of Compound I-19

3,5-Dimethoxycarbonylbenzenesulfonyl chloride (1.9 grams) and 2 ml of pyridine were added to 2.7 grams of 5-amino-2-(3,5-disulfophenylcarbamoyl)-1-naphthol and 27 ml of N,N-dimethylacetamide. The mixture was stirred for 1 hour at room temperature and then 50 ml of ethyl alcohol were added, and the crystals which precipitated out were recovered by filtration. 30 ml of methyl alcohol, 2 grams of sodium hydroxide and 10 ml of water were added to the crystals and, after boiling under reflux for 1 hour, 5 grams of 5-(3,5-dicarboxyphenylsulfonamido)-2-(3,5-disulfophenylcarbamoyl)-1-naphthol were obtained.

Nitroso compound (1.8 grams), 2 ml of triethylamine and 2 ml of acetic anhydride were introduced into 3.3 grams of the compound obtained in the way described above and 30 ml of methyl alcohol. After stirring the mixture for 1 hour at room temperature, 3.5 grams of potassium acetate were added, and the crystals which precipitated out were recovered by filtration. The crystals were recrystallized from a water/methyl alcohol solvent mixture and 1.4 grams of dye were obtained. Melting Point: Above 200° C.

$\lambda_{max}(H_2O)$ 738.7 nm, $\epsilon: 4.73 \times 10^4$

Preparation of Compound I-20

This dye was prepared in the same way as above except that m-chlorosulfonylbenzoyl chloride was used instead of the 3,5-dimethoxycarbonylbenzenesulfonyl chloride.

Melting Point: Above 200° C.

$\lambda_{max}(H_2O)$: 752.3 nm, $\epsilon: 4.01 \times 10^4$

Other compounds can be prepared in the same way.

The dyes of general formula (I) described above are dissolved in a suitable solvent {for example, water, an alcohol (for example, methanol or ethanol) or methylcellosolve, or in a mixture of these solvents}, or preferably they are added to a photosensitive or non-photosensitive hydrophilic colloid layer coating liquid as an aqueous dissociated material. Two or more of these dyes may be used in combination, or they may be used singly.

The aforementioned dyes are generally used in amounts of from $10^{-3}$ g/m$^2$ to 2.5 g/m$^2$, and preferably used in the range from $10^{-3}$ g/m$^2$ to 1.0 g/m$^2$.

The aforementioned photographic dyes represented by general formula (I) are especially effective in terms of preventing irradiation, and they are in the main added to an emulsion layer when used for this purpose.

The photographic dyes of general formula (I) are also especially effective as dyes for preventing halation, and in this case they are added to a layer on the reverse side of the support or to a layer between the support and the emulsion layer.

The photographic dyes of general formula (I) can also be used effectively as filter dyes, and in this case, they are added to a layer on the reverse side of the support or to a layer between the support and the emulsion layer or to a layer between the emulsion layers.

In the present invention, the dyes represented by general formula (I) are preferably used together with a binder.

The hydrophilic colloid materials which can be used as a binder include gelatin, gelatin substitutes, collodion, gum arabic, cellulose ester derivatives such as alkyl esters of carboxylated cellulose, hydroxyethyl cellulose and carboxymethyl hydroxyethyl cellulose, synthetic resins such as the amphoteric copolymers disclosed in U.S. Pat. No. 2,949,442, poly(vinyl alcohol) and the other materials known to those in this art.

Examples of macromolecular gelatin substitutes include copolymers of allylamine and methacrylic acid, copolymers of allylamine and acrylic acid and acrylamide, hydrolysed copolymers of allylamine and methacrylic acid and vinyl acetate, copolymers of allylamine and acrylic acid and styrene, and copolymers of allylamine and methacrylic acid and acrylonitrile.

The infrared dyes of the present invention can be used desirably in silver halide photographic photosensitive materials which have at least one photosensitive layer which has a spectral sensitivity in the infrared region. This silver halide photographic photosensitive material may be any such material, provided that a visible image can be obtained by subjecting a latent image obtained by means of an image-wise exposure, to development, bleaching, fixing (transfer) etc. The present invention can be used desirably with both black-and-white photographic materials and color photographic materials. Furthermore, color papers, color reversal papers, direct positive color papers, color negative films, color reversal films and color diffusion transfer photosensitive materials, for example, can be cited as suitable color photographic materials. Their use in silver halide photosensitive materials, with which an image is formed by means of a scanning exposure using high density monochromatic light such as that from a semiconductor laser or an LED for example, is especially desirable.

Silver chloride, silver bromide, silver chlorobromide, silver iodobromide, silver chloroiodobromide and the like can be used for the silver halide emulsion of these silver halide photosensitive materials. But a silver chlorobromide emulsion is preferred for realizing rapid processing and simple processing.

The use of high silver chloride grains in which from 0.01 mol % to 3 mol % of silver iodide is included in the emulsion surface, as disclosed in JP-A-3-84545, for the silver chlorobromide emulsion is desirable with a view to increasing infrared spectrally sensitized speed and increasing stability. Furthermore, the use of an emulsion consisting of essentially silver iodide free silver chlorobromide or silver chloride is desirable for speeding up development processing time. Here, the term "essentially silver iodide free" signifies that the silver iodide content is not more than 1 mol %, preferably not more than 0.2 mol %.

The halogen composition of the emulsion may differ from grain to grain, or it may be uniform. But it is easier to make the grains homogeneous if an emulsion in which the halogen composition is uniform from grain to grain is used.

Furthermore, the silver halide composition distribution within the silver halide emulsion grains may be selected appropriately. One can use grains which have a so-called uniform structure in which the composition is uniform throughout all parts of the silver halide grains, grains which have a so-called layer type structure in which the halogen composition in the core which forms the interior of the silver halide grains and in the surrounding shell part of the grains (the shell may be a single layer or a plurality of layers) is different, or grains which have a structure in which there are parts which have a different halogen composition in a non-layer like form within the grains or on the surfaces of the grains (i.e., structures such that parts which have a different halogen composition are joined at the edges, corners or surfaces of the grains where the parts which have a different composition are at the surface of the grains). The use of grains of either of the latter two types is preferable to the use of grains which have a uniform structure for obtaining a high photographic speed. Those grains are also preferred from the point of view of the pressure resisting properties. In those cases where the silver halide grains have a structure such as those mentioned above, the boundary region between the parts which have different halogen compositions may be a distinct boundary, or it may be an indistinct boundary where a mixed crystal is formed according to the difference in composition, or it may be such that there is a positive and continuous change in the structure.

Furthermore, the use of so-called high silver chloride emulsions which have a high silver chloride content is preferred in photosensitive materials which are suited to rapid processing. The silver chloride content of a high silver chloride emulsion in the present invention is preferably at least 95 mol %, and more preferably at least 97 mol %.

Structures which have a silver bromide local phase in the form of a layer or in a form other than a layer within the silver halide grains and/or at the grain surface as described earlier, are preferred in these high silver chloride content emulsions. The halogen composition of the abovementioned local phase preferably has a silver bromide content of at least 10 mol %, more preferably in excess of 20 mol %. These local phases can be within the grains or at the edges or corners of the grain surface or on the surfaces of the grains. In one preferred example, the phase is grown epitaxially on the corners of the grains.

Furthermore, a further increase in the silver chloride content of the silver halide emulsion is also effective for reducing the replenishment rate of the development processing bath. In such a case, the use of a virtually pure silver chloride emulsion which has a silver chloride content of from 98 mol % to 100 mol % is also desirable.

The average grain size of the silver halide grains included in the silver halide emulsions of the present invention is preferably $0.1\mu$ to $2\mu$ (the average grain size is the numerical average of the grain size which is taken to be the diameter of the circle of area equal to the projected area of the grain).

Furthermore, the grain size distribution is preferably that of a so-called mono-dispersion in which the variation coefficient (the value obtained by dividing the standard deviation of the grain size distribution by the average grain size) is not more than 20%, more preferably not more than 15%. The use of blends of the above-mentioned mono-dispersions in the same layer, or the lamination coating of mono-dispersions, is desirable for obtaining a wide latitude.

The silver halide grains which are included in the photographic emulsion may have a regular crystalline form such as a cubic, tetradecahedral or octahedral form, an irregular crystalline form such as a spherical or plate-like form, or a form which is a composite of such crystalline forms. Furthermore, mixtures of grains which have various crystalline forms may be used. The inclusion of at least 50%, preferably at least 70%, and more preferably at least 90%, of grains from among those which have the abovementioned regular crystalline form, is desirable in the present invention.

Furthermore, the use of emulsions in which tabular grains which have an average aspect ratio (diameter of the calculated circle/thickness) of at least 5, and preferably of at least 8, account for more than 50% of all the grains in terms of projected area, is also desirable.

The silver halide emulsions used in the present invention can be prepared using the methods disclosed, for example, by P. Glafkides in *Chimie et Physique Photographique*, published by Paul Montel, 1967, by G. F. Duffin in *Photographic Emulsion Chemistry*, published by Focal Press, 1966, and by V. L. Zelikmann et al. in *Making and Coating Photographic Emulsions*, published by Focal Press, 1964. That is to say, they can be prepared using acidic methods, neutral methods and ammonia methods for example. A single jet mixing procedure, a double jet mixing procedure, or a combination of such procedures, can be used for reacting the soluble silver salt with the soluble halogen salt. Methods in which the grains are formed in the presence of an excess of silver ions (so-called reverse mixing methods) can also be used. The method in which the pAg value in the liquid phase in which the silver halide is formed is held constant (i.e., the so-called controlled double jet method), can also be used as a double jet mixing procedure. It is possible to obtain silver halide emulsions with an almost uniform grain size with a regular crystalline form if this method is used.

The inclusion of various metal ions or complex ions in the local phase or in the substrate of the silver halide grains of the present invention is desirable. Combinations of ions or complex ions selected from among iridium, rhodium, iron and the like can be employed in the main in the local phase. Combinations of metal ions or complex ions selected from among osmium, iridium, rhodium, platinum, ruthenium, palladium, cobalt, nickel, iron and the like can be employed in the main in the substrate. Furthermore, the type and concentration of the metal ions can be different in the local phase and the substrate. A plurality of these metals may be used.

Furthermore, metal ions such as cadmium, zinc, lead, mercury, thallium and the like can also be used.

The silver halide emulsion which is used in a photosensitive material for scanning exposure purposes using a laser must be suitable for exposure at high brightness levels. It must also have a gradation such that the required density appears within the exposure control range of the laser. Moreover, in cases where infrared spectral sensitization is used, the storage properties must be improved. With this in view, the use of iridium, rhodium, tellurium or iron ions or complex ions from among the abovementioned metal ions is especially useful. The amount of these metal ions or complex ions used differs greatly according to the composition and size of the silver halide emulsion which is being doped and the location of the doping. But with iridium and rhodium ions, the use of from $5 \times 10^{-9}$ mol to $1 \times 10^{-4}$ mol per mol of silver is desirable, and with iron ions, the use of from $1 \times 10^{-7}$ mol to $5 \times 10^{-3}$ mol per mol of silver is desirable.

The compounds which provide these metal ions are included in a local phase and/or in the other parts (e.g., the substrate) of the silver halide grains of the present invention by inclusion in the aqueous gelatin solution which forms the dispersion medium, the aqueous halide solution, the aqueous silver salt solution or in some other aqueous solution during the formation of the silver halide grains. Or they are added in the form of fine silver halide grains which contain the metal ions which are then caused to dissolve.

The inclusion of the metal ions used in the emulsion grains can be carried out before grain formation, during grain formation, or immediately after grain formation. This can be varied according to where in the grains the metal ions are to be included.

The silver halide emulsions used in the present invention are generally subjected to chemical and spectral sensitization.

Chemical sensitization with chalcogen sensitizers (in practical terms, sulfur sensitization typified by the addition of unstable sulfur compounds or selenium sensitization with selenium compounds or tellurium sensitization with tellurium compounds), precious metal sensitization typified by gold sensitization, or reduction sensitization, may be used individually or conjointly for chemical sensitization. The use of the compounds disclosed from the lower right hand column on page 18 to the upper right hand column of page 22 of JP-A-62-215272 is desirable as the compounds which are used for chemical sensitization.

Various compounds or precursors thereof can be added to a silver halide emulsion of the present invention with a view to preventing the occurrence of fogging during the manufacture, storage or photographic processing of the photosensitive material, or with a view to stabilizing photographic performance. The compounds disclosed on pages 39 to 72 of the previously mentioned JP-A-62-215272 can be used desirably as examples of such compounds. Moreover, use of the compounds disclosed in EP-A-447647 is also desirable.

Spectral sensitization is carried out with a view to rendering an emulsion in a photosensitive material of the present invention spectrally sensitive to light of a prescribed wavelength region. In cases where monochromatic high density light such as that from a laser or an LED is to be used for exposure purposes, spectral sensitization must be carried out to match the wavelength of this light. The execution of spectral sensitization to match the light signifies carrying out spectral sensitization using sensitizing dyes which have a spectral sensitivity at the wavelength of the light. But it does not always signify that the maximum spectral sensitization sensitivity matches the wavelength of the light. Matching the wavelength of the light and the peak spectral sensitivity wavelength is desirable from the viewpoint of sensitivity to the light and, in the case of color sensitive materials, from the viewpoint of color separation. The design of some intentional displacement of the wavelength of the light and the peak spectral sensitization wavelength is desirable for minimizing the variation in photographic speed arising from fluctuations in the wavelength and intensity, for example, which arise as a result of fluctuations in the temperature of the laser. The spectrally sensitizing dyes described, for example, by F. M. Harmer in *Heterocyclic Compounds, Cyanine Dyes and Related Compounds*, (John Wiley & Sons [New York, London], 1964) are spectrally sensitizing dyes which can be used for such spectral sensitization. Use of the compounds and spectral sensitization methods disclosed from the upper right hand column on page 22 to page 38 of the aforementioned JP-A-62-215272 is desirable.

Effective spectral sensitization in the region from red to infrared is needed in cases where semiconductor lasers or LED are used as the light source for scanning exposure purposes in the present invention. Especially descriable are the sensitizing dyes disclosed from the upper left hand column on page 12 to the lower left hand column of page 21 of JP-A-3-15049, or from the lower left hand column of page 4 to the lower left hand column on page 15 of JP-A-3-20730, from line 21 on page 4 to line 54 on page 6 of EP-A-420011, from line 12 of page 4 to line 33 of page 10 of EP-A-420012, in EP-A-443466 and in U.S. Pat. No. 4,975,362, for spectral sensitization in the region above 730 nm. These sensitizing dyes are distinguished by being comparatively stable in chemical terms, by being adsorbed comparatively strongly on the surface of silver halide grains, and by being strongly desorbed with dispersions of couplers for example which are also present. Compounds which have a reduction potential of −1.05 (V vs SCE) or lower are especially desirable as sensitizing dyes for infrared sensitization purposes. Among these compounds, those which have a reduction potential of −1.10 or below are preferred. Sensitizing dyes which have this characteristic are effective for increasing photographic speed and, in particular, for stabilizing photographic speed and stabilizing the latent image.

The measurement of reduction potentials can be carried out using phase discrimination type second harmonic alternating current polarography. This is carried out using a dropping mercury electrode for the working electrode, a saturated calomel electrode for the reference electrode, and platinum for the counter-electrode.

Furthermore, the measurement of reduction potentials by means of phase discrimination type second harmonic alternating current voltametry using platinum for the working electrode has been described in *Journal of Imaging Science*, Vol. 30, pages 27 to 35 (1986).

For inclusion in a silver halide emulsion, these spectrally sensitizing dyes may be dispersed directly in the emulsion or they may be dissolved in an individual solvent such as water, methanol, ethanol, propanol, methylcellosolve or 2,2,3,3-tetrafluoropropane for example, or in a mixture of these solvents. Furthermore, they may be formed into aqueous solutions which contain acids or bases as disclosed, for example, in JP-B-44-23389, JP-B-44-27555 or JP-B-57-22089, or they can be formed into an aqueous solution or colloidal dispersion in the co-presence of a surfactant, as disclosed for example in U.S. Pat. Nos. 3,822,135 and 4,006,025, for addition to the emulsion. (The term "JP-B" as used herein signifies an "examined Japanese patent publication".) Furthermore, they may be dissolved in a solvent which is essentially immiscible with water such as phenoxyethanol and then dispersed in water or a hydrophilic colloid for addition to the emulsion. Direct dispersion in a hydrophilic colloid, as disclosed in JP-A-53-102733 and JP-A-58-105141, with addition of the dispersion to the emulsion, can also be employed. The time at which the addition to the emulsion is made may be at any stage during the manufacture which has been known to be suitable. Thus, the time can be before the formation of the gains of the silver halide emulsion, during grain formation, before the washing process and immediately after grain formation, before chemical sensitization, during chemical sensitization, before cooling and solidifying the emulsion and immediately after chemical sensitization, or during the preparation of a coating liquid. The addition is usually made at a time after the completion of chemical sensitization and before coating. But the addition can be made at the same time as the chemical sensitization as disclosed in U.S. Pat. Nos. 3,628,969 and 4,225,666 and spectral sensitization can be carried out at the same time as chemical sensitization. Or the addition can be made before chemical sensitization as disclosed in JP-A-58-113928. The addition can also be made such that chemical sensitization can be started before the precipitation and formation of the silver halide grains has been completed. Moreover, the addition can be made by dividing the spectrally sensitizing dye, which is to say with the addition of part of the dye before chemical sensitization with the remainder being added after chemical sensitization, as disclosed in U.S. Pat. No. 4,225,666. The addition can be made at any time during the formation of the silver halide grains based on the method described in U.S. Pat. No. 4,183,756. From among these methods, the addition of the sensitizing dye before washing the emulsion or before chemical sensitization is especially desirable.

The amounts in which these spectrally sensitizing dyes are added vary over a wide range depending on the particular case. It is preferably in the range from $0.5 \times 10^{-6}$ mol to $1.0 \times 10^{-2}$ mol per mol of silver halide. It is more preferably in the range from $1.0 \times 10^{-6}$ mol to $5.0 \times 10^{-3}$ mol per mol of silver halide.

In those cases where a sensitizing dye which has a spectral sensitizing sensitivity in the range from red to infrared is used in the present invention, the compounds disclosed from the lower right hand column on page 13 to the lower right hand column on page 22 of JP-A-2-157749 are preferred. By using these compounds it is possible to increase the stability of the sensitive material during storage and processing and to increase the supersensitizing effect uniquely. The use of compounds of general formulae (IV), (V) or (VI) from the same specification conjointly is especially desirable. These compounds are used in amounts of from $0.5 \times 10^{-5}$ mol to $5.0 \times 10^{-2}$ mol, and preferably of from $5.0 \times 10^{-5}$ mol to $5.0 \times 10^{-3}$ mol, per mol of silver halide. A suitable amount is in the range from 1 to 10,000 times, and preferably from 2 to 5,000 times, per mol of sensitizing dye.

No particular limitation is imposed upon the exposure system for photosensitive materials of the present invention. Thus a surface exposure using the conventional light sources such as sun light, fluorescent lamps, tungsten lamps or xenon lamps for example can be used. But the use of a scanning type digital exposure where the picture is exposed by moving a high density beam of light, such as laser light or light from an LED, relative to the photosensitive material is preferred. In the case of exposure with a scanning exposure, the time for which the silver halide in the sensitive material is exposed is the time required to expose a certain very small area. The smallest unit in which the quantity of light can be controlled from the respective digital data is generally used for the very small area, and this is called a picture element. Hence, the exposure time per picture element varies with the size of the picture elements. The size of the picture elements depends on the picture element density, and the practical range is from 50 to 2000 dpi. If the exposure time is defined as the time for the exposure of a picture element size when the picture element density is 400 dpi, the preferred exposure time is not more than $10^{-4}$ seconds, more preferably not more than $10^{-6}$ seconds.

The structure of a photosensitive material in a case where color images are to be obtained using a scanning exposure using the dyes of the present invention in a color photosensitive material is described below. Such a color photosensitive material has at least three silver halide emulsion layers on a support, and at least one layer preferably has a spectral sensitivity in the infrared region. Monochromatic high density light, such as that from a gas laser, a light emitting diode, a semiconductor laser or a second harmonic generator in which a semiconductor laser/solid laser and a non-linear optical element are combined, is used for the scanning exposure light source for exposing this color sensitive material. The use of a semiconductor laser or second harmonic generating apparatus in which a semiconductor laser/solid laser and a non-linear optical element are combined is preferred for providing a compact and cheap system. The use of a semiconductor laser is especially desirable for designing an apparatus which is compact and cheap, has a long life, and is very stable. When using semiconductor lasers, the use of materials in which at least one layer has a spectral sensitivity peak of above 730 nm or at least two layers which have spectral sensitivity peaks above 670 nm is preferred. This is because the oscillating wavelengths of stable semiconductor lasers which are cheap and easily obtained are at the present time only to be found in the region from red to infrared. However, semiconductor lasers in the green or blue region have been confirmed in the laboratory, and if manufacturing techniques are developed for these semiconductor lasers, it can be anticipated that it will be possible to use these semiconductor lasers satisfactorily both cheaply and in a stable manner. In such a case, the need for having at least two layers with a spectral sensitivity peak of 670 nm or above is reduced.

The photosensitive layers in the photosensitive materials preferably contain at least one type of coupler which forms a color by means of a coupling reaction with the oxidized form of an aromatic amine based compound. For full-color hard copy purposes, the provision of at least three types of silver halide photosensitive layer which have different color sensitivities on a support and the inclusion of couplers which form either the color yellow, the color magenta or the color cyan by means of a coupling reaction with the oxidized form of an aromatic amine based compound in each of these layers is desirable. The three different types of spectral sensitivity can be elected arbitrarily according to the wavelengths of the light sources which are used for the digital exposure, but a separation of at least 30 nm between the closest spectral sensitization peaks is desirable.

No particular limitation is imposed upon the relationship of the color forming couplers (Y,M,C) which are included in the photosensitive layers which have at least three different spectral sensitization peaks $(\lambda_1, \lambda_2, \lambda_3)$. There are $3 \times 2 = 6$ possible combinations. There are also preferred cases in which, from the viewpoint of the resolving power of the human eye, the photosensitive layer of the longest wavelength is the yellow color forming layer. Furthermore, no particular limitation is imposed upon the coating order from the support side of the at least three photosensitive layers which have different spectral sensitization peaks. But there are preferred cases where, from the viewpoint of rapid processing, the photosensitive layer which contains the silver halide grains of which the average grain size is the largest is located as the uppermost layer. Moreover, there are also preferred cases where, from the viewpoint of sharpness, the photosensitive layer which has the spectral sensitization of the longest wavelength is located as the uppermost layer. Moreover, there are also preferred cases where, from the viewpoint of the storage properties of the hard copy under bright illumination for example, the magenta color forming layer is established as the lowermost layer. Hence, there are 36 possible combinations of layer order and three types of coupler and three types of spectral sensitivity. The present invention can be used effectively in all 36 types of photosensitive material.

Examples of digital light sources, spectral sensitization peaks and color forming couplers are shown in Table 1, but the possibilities are not limited to these examples.

TABLE 1

| Digital Scanning Exposure Light Source | | | Spectral Sensitization Peak of the |
| --- | --- | --- | --- |
| Light Source | Wavelength (nm) | Color Formed | Sensitive Material (nm) |
| 1 AlGaInAs(670) | 670 | C | 670 |
| GaAlAs(750) | 750 | Y | 730 |
| GaAlAs(810) | 810 | M | 810 |
| 2 AlGaInAs(670) | 670 | Y | 670 |
| GaAlAs(750) | 750 | M | 750 |
| GaAlAs(830) | 830 | C | 830 |
| 3 AlGaInAs(670) | 670 | M | 670 |
| GaAlAs(750) | 750 | C | 750 |
| GaAlAs(810) | 810 | Y | 810 |
| 4 AlGaInAs(670) | 670 | Y | 670 |
| GaAlAs(780) | 780 | C | 780 |
| GaAlAs(830) | 830 | M | 840 |
| 5 AlGaInAs(670) | 670 | C | 670 |
| GaAlAs(780) | 780 | M | 780 |
| GaAlAs(880) | 880 | Y | 880 |
| 6 GaAlAs(780) | 780 | M | 780 |
| GaAlAs(830) | 830 | Y | 830 |
| GaAlAs(880) | 880 | C | 880 |
| 7 AlGaInAs(633) | 633 | Y | 630 |
| AlGaInAs(680) | 680 | M | 680 |
| GaAlAs(780) | 780 | C | 780 |
| 8 GaAs(900) + SHG | 450 | Y | 450 |
| InGaAs(1200) + SHG | 600 | M | 580 |
| AlGaInAs(680) | 680 | C | 700 |
| 9 LED(580) | 580 | C | 580 |
| LED(670) | 670 | M | 670 |
| LED(810) | 810 | Y | 810 |

1) SHG: A second harmonic obtained using a non-linear optical element was used.

The dyes (oxonol dyes and cyanine dyes), which can be decolorized by the processing disclosed on pages 27 to 76 of EP-A2-337490, can be used conjointly in a hydrophilic colloid layer in a photosensitive material which is in accordance with the present invention in addition to the infrared dyes of the present invention with a view to preventing the occurrence of irradiation and halation and with a view to improving safe-light safety for example. Furthermore, the use of dyes which are included in a hydrophilic colloid layer in the form of a fine solid particle dispersion and which are decolorized in the development process, such as the dyes disclosed from the upper right hand column on page 3 to page 8 of JP-A-2-282244 and the dyes disclosed from the upper right hand column on page 3 to the lower left hand column on page 11 of JP-A-3-7931, is also desirable. Additionally, in cases where these dyes are used, the selection and use of dyes which have an absorbance such that it overlaps the spectral sensitization peak of the photosensitive layer is preferred. The setting of the optical density (the logarithm of the reciprocal of the optical transmittance) (the reflection density in the case of a reflective support) at the exposure wavelength of the photosensitive material to at least 0.5 using these dyes is desirable for improving sharpness.

Moreover, the inclusion of at least 12% by weight (and preferably of at least 14% by weight) of titanium oxide which has been surface treated with a dihydric to tetrahydric alcohol (for example trimethylolethane) for example in a water resistant resin layer of the support is desirable for improving sharpness. Moreover, the use of colloidal silver in an antihalation layer as disclosed in JP-A-1-239544 is also desirable.

The use of the silver halide emulsions and other elements (additives etc.) which are suitable for use in a photosensitive material of the present invention, the photographic layer structures (layer arrangements etc.), the methods of processing which are suitable for processing these sensitive materials and the additives for processing purposes which have been disclosed in the patents indicated below, and especially in EP-A2-355660 (JP-A-2-139544) is desirable.

| Photographic Structural Element | JP-A-62-215272 | JP-A-2-33144 | EP-A2-355660 |
| --- | --- | --- | --- |
| Silver Halide Emulsions | Upper right column on page 10, line 6, to lower left column on page 12, line 5, and lower right column on page 12, fourth line from the bottom, to upper left column on page 13, line 17. | Upper right column on page 28, line 16, to lower right column on page 29, line 11, and page 30, lines 2 to 5. | Page 45 line 53 to page 47 line 3, and page 47 lines 20 to 22 |
| Silver Halide Solvent | Lower left column on page 12, lnes 6 to 14, and upper left column on page 13, line 3 from the bottom, to lower left column on page 18, last line | — | — |
| Chemical Sensitizers | Page 12, lower left column, line 3 from the bottom, to lower right column line 5 from the bottom and lower right column on page 18, line 1, to upper right column on page 22, line 9 from the bottom | Lower right column on page 29 line 12 to the last line. | Page 47, line 4 to 9 |
| Spectral Sensitizers (Methods of Spectral Sensitization) | Upper right column on page 22, line 8 from the bottom, to last line on page 38 | Upper left column on page 30, lines 1 to 13. | Page 47, lines 10 to 15 |
| Emulsion Stabilizers | Upper left column on page 39, line 1, to upper right | Upper left column on page 30, line 14, to upper line 1 | Page 47 lines 16 to 19 |

-continued

| Photographic Structural Element | JP-A-62-215272 | JP-A-2-33144 | EP-A2-355660 |
|---|---|---|---|
| | column on right column page 72, last line | | |
| Development Accelerators | Lower left column on page 72, line 1, to upper right column on page 91, line 3 | — | — |
| Color Couplers (Cyan, Magenta and Yellow Couplers) | Upper right column on page 91, line 4, to upper left column on page 121, line 6 | Upper right column on page 3, line 14, to upper left column on page 18, last line, and upper right column on page 30, line 6, to lower right column on page 35, line 11 | Page 4, lines 15 to 27, page 5 line 30 to the last line on page 28, page 45 lines 29 to 31 and page 47, line 23, to page 63, line 50 |
| Color Intensifiers | Upper left column on page 121, line 7, to upper right column on page 125, line 1 | — | — |
| Ultraviolet Absorbers | Upper right column on page 125, line 2, to lower left column on page 127, last line | Lower right column on page 37, line 14, to upper left column on page 38, line 11 | Page 62, lines 22 to 31 |
| Anti-fading Agents (Image Stabilizers) | Lower right column on page 127, line 1, to lower left column on page 137, line 8 | Upper right column on page 36, line 12, to upper left column on page 37, line 19 | Page 4 line 30 to page 5 line 23, page 29 line 1 to page 45 line 25, page 45 line 33 to 40, page 65 lines 2 to 21 |
| High Boiling Point and/or Low Boiling Point Organic Solvents | Lower left column on page 137, line 9, to upper right column on page 144, last line | Lower right column on page 35, line 14, to upper left column on page 36, line 4 from the bottom | Page 64, lines 1 to 51 |
| Methods for the Dispersion of Photographically Useful Additives | Lower left column on page 144, line 1, to upper right column on page 146, line 7 | Lower right column on page 27, line 10, to upper left column on page 28, last line, and lower right column on page 35, line 12, to upper right column, page 36, line 7 | Page 63 line 51 to page 64 line 56 |
| Film Hardening Agents | Upper right column on page 146, line 8, to lower left column on page 155, line 4 | — | — |
| Developing Agent Precursors | Lower Left column on page 155, line 5, to lower right column on page 155, line 2 | — | — |
| Development Inhibitor Releasing Compounds | Lower right column on page 155 lines 3 to 9 | — | — |
| Supports | Lower right column on page 155, line 19, to upper left column on page 156, line 14 | Upper right column on page 38, line 18, to upper left column on page 39, line 8 | Page 66, line 29 to page 67, line 13 |
| Sensitive Material Layer Structure | Upper left column on page 156, line 15, to lower right column on page 156, line 14 | Upper right column on page 28, lines 1 to 15 | Page 45, lines 41 to 52 |
| Dyes | Lower right column on page 156, line 15, to lower right column on page 184, last line | Upper left column on page 38, line 12, to upper right column, line 7 | Page 66, lines 18 to 22 |
| Anti-color Mixing Agents | Upper left column on page 185, line 1, to lower right column on page 188, line 3 | Upper right column on page 36, lines 8 to 11 | Page 64, line 57 to page 65, line 1 |
| Gradation Control Agents | Lower right column on page 188, lines 4 to 8 | — | — |
| Anti-staining Agents | Lower right column on page 188, line 9, to lower right column on page 193, line 10 | Upper left column on page 37, last line, to lower right column, line 13 | Page 65, line 32 to page 66, line 17 |
| Surfactants | Lower left column on page 201, line 1, to upper right column on page 210, last line | Upper right column on page 18, line 1, to lower right column on page 24, last line, and lower left column on page 27, line 10 from the bottom, to lower right column, line 9 | — |
| Fluorine Containing Compounds (Anti-static agents, coating promotors, lubricants, antistick agents and the like) | Lower left column on page 210, line 1, to lower left column on page 222, line 5 | Upper left column on page 25, line 1, to lower right column on page 27, line 9 | — |

-continued

| Photographic Structural Element | JP-A-62-215272 | JP-A-2-33144 | EP-A2-355660 |
| --- | --- | --- | --- |
| Binder (Hydrophilic colloids) | Lower left column on page 222, line 6, to upper left column on page 225, last line | Upper right column on page 38, lines 8 to 18 | Page 66, lines 23 to 28 |
| Thickeners | Upper right column on page 225, line 1, to upper right column on page 227, line 2 | — | — |
| Anti-static Agents | Upper right column on page 227, line 3, to upper left column on page 230, line 1 | — | — |
| Polymer Latexes | Upper left column on page 230, line 2, to page 239, last line | — | — |
| Matting Agents | Upper left column on page 240, line 1, to upper right column on page 240, last line | — | — |
| Photographic Processing Methods (Processing operations and additives etc.) | Upper right column on page 3, line 7, to upper right column on page 10, line 5 | Upper left column on page 39, line 4, to upper left column on page 42, last line | Page 67, line 14, to page 69, line 28 |

NOTES
The citations from JP-A-62-215272 also include the details amended in accordance with the procedural amendment dated March 16, 1987 which is appended to the end of the specification.
Furthermore, from among the color couplers mentioned above, the use of the so-called short wave type yellow couplers disclosed in JP-A-63-231451, JP-A-63-123047, JP-A-63,241547, JP-A-1-173499, JP-A-1-213648 and JP-A-1-250944 as yellow couplers is preferred.

The use of compounds for improving the color image storage properties such as those disclosed in EP-A2-277589 along with the couplers indicated above is desirable in a case where a dye of the present invention is used in a color photosensitive material. Their conjoint use with pyrazoloazole couplers is especially desirable.

That is to say, the use either simultaneously or independently of compounds (F) which bond chemically with aromatic amine based developing agents which remain after color development processing to form compounds which are chemically inert and essentially colorless and/or compounds (G) which bond chemically with the oxidized form of aromatic amine based color developing agents which remain after color development processing and form compounds which are chemically inert and which are essentially colorless is desirable for example for preventing the occurrence of staining due to the formation of colored dyes by the reaction of couplers with a color developing agent or the oxidized form of a color developing agent which remains in the film, and other side effects, on storage after processing.

Furthermore, the use of the 3-hydroxypyridine based cyan couplers disclosed in EP-A2-333185 (from among these the couplers which have been made into two-equivalent couplers by including a chlorine leaving group in the four-equivalent coupler, coupler (42), which is cited as an example, and the couplers (6) and (9), are especially desirable), and the ring-like active methylene based cyan couplers disclosed in JP-A-64-32260 (from among these the couplers 3, 8 and 34 which are cited as examples are especially desirable) as well as the diphenylimidazole based cyan couplers disclosed in JP-A-2-33144 as cyan couplers, is desirable.

Furthermore, the addition of biocides such as those disclosed in JP-A-63-271247 to a photosensitive material in accordance with the present invention is desirable for preventing the growth of various fungi and bacteria which propagate in the hydrophilic colloid layers and cause deterioration of the image.

Furthermore, white polyester based supports for display purposes or supports which have a layer which contains a white pigment formed on the side of the support on which the silver halide emulsion layer is to be formed may be used for the support in the photosensitive material in accordance with the present invention. Moreover, the coating of an anti-halation layer on the side of the support on which the silver halide emulsion layer is coated or on the reverse side is desirable for improving sharpness. The establishment of a support transmission density within the range of 0.35 to 0.8 so that the display can be viewed using both reflected light and transmitted light is especially desirable.

Moreover, the use of a transparent support is also desirable for the support which is used for a photosensitive material in accordance with the present invention. The coating of an anti-halation layer on the silver halide emulsion layer coated side or on the reverse side of the support is desirable.

The exposed photosensitive material can be subjected to the usual development processing.

Color development processing is carried out in the case of a color photosensitive material, and the use of a bleach-fix process after color development is desirable from the viewpoint of rapid processing. In cases where the aforementioned high silver chloride emulsions are used, the pH of the bleach-fixer is preferably not more than about 6.5, and more preferably not more than about 6, from the viewpoint of accelerating de-silvering for example.

The method disclosed in JP-A-2-207250 is preferred as the method of processing a color sensitive material of the present invention.

The processing temperature of a color developer which can be used in the present invention is from 20°

C. to 50° C., preferably from 30° C. to 45° C. The preferred processing time is essentially within 25 seconds. A lower rate of replenishment is desirable, but a replenishment rate of 20 to 600 ml per 1 m² of photosensitive material is appropriate, and a replenishment rate of 50 to 300 ml is preferred. The rate of replenishment is more desirably 60 to 200 ml, and most desirably 60 to 150 ml, per 1 m² of photosensitive material.

In the present invention, the color development time can be determined arbitrarily according to the coated weight of silver and the gain size in the photosensitive material. But a color development time of essentially within 45 seconds, and more preferably of within 25 seconds, is preferred. Here the term "essentially within a certain time" indicates the interval from when the photosensitive material is introduced into the development tank until it is introduced into the next tank, and it includes the time while the photosensitive material is being carried through the air from the development tank into the next tank.

The preferred pH for the water washing process or stabilizing process is from 4 to 10, and more preferably from 5 to 8. The temperature can be set according to the use and characteristics of the photosensitive material, but it is generally from 30° C. to 45° C., preferably from 35° C. to 42° C. The time can be set arbitrarily, but a shorter time is desirable from the viewpoint of reducing the processing time. The time is preferably from 10 to 45 seconds, and more preferably from 10 to 40 seconds. The rate of replenishment is preferably low from the viewpoint of the running costs, reducing the amount of effluent and the handling characteristics.

In practice, the preferred rate of replenishment is from 0.5 to 50 times, and preferably from 2 to 15 times, the amount of carry-over of the previous bath per unit area of photosensitive material. Alternatively, it is not more than 300 ml, and preferably not more than 150 ml, per 1 m² of photosensitive material. Furthermore, replenishment can be carried out continuously or intermittently.

The liquid which has been used in the water washing and/or stabilizing process can be used in an earlier process. For example, the overflow of water washing water which has been reduced by means of a multi-stage counter-flow system can be introduced into the preceding bleach-fix bath which can then be replenished using a concentrate and the amount of effluent can be reduced in this way.

In cases where the photosensitive material of the present invention is a black and white sensitive material, the sensitizing dyes disclosed as (9) to (15) in JP-A-62-123454 are preferred. Furthermore, (15) to (22) in JP-A-62-123454 can be used as super-sensitizers and other additives. Furthermore, (23) to (25) of JP-A-62-123454 can be used in actual embodiments.

EXAMPLE 1

Preparation of Emulsion (a)

Sodium chloride (3.3 grams) was added to a 3% aqueous solution of lime treated gelatin, and 3.2 ml of N,N'-dimethyl-imidazolin-2-thione (2% aqueous solution) was added. An aqueous solution which contained 0.2 mol of silver nitrate and an aqueous solution which contained 0.2 mol of sodium chloride and 15 μg of rhodium trichloride were added to, and mixed with, this aqueous solution at 56° C. while agitating the mixture vigorously. Next, an aqueous solution which contained 0.78 mol of silver nitrate and an aqueous solution which contained 0.78 mol of sodium chloride and 4.2 mg of potassium ferrocyanide were added and mixed at 56° C. while agitating the mixture vigorously.

Five minutes after the addition of the aqueous silver nitrate solution and the aqueous alkali halide solution had been completed, an aqueous solution which contained 0.02 mol of silver nitrate and an aqueous solution which contained 0.015 mol of potassium bromide, 0.005 mol of sodium chloride and 0.8 mg of hexachloroiridium(IV) acid, potassium salt, were added and mixed at 40° C. with vigorous agitation. After this, an isobutene maleic acid mono-sodium salt copolymer was added, precipitation and washing were carried out, and the emulsion was de-salted. Moreover, 90.0 grams of lime treated gelatin were added, and the pH and pAg values of the emulsion were adjusted to 6.2 and 6.5 respectively Moreover, $1 \times 10^{-5}$ mol/mol.Ag of sulfur sensitizer (triethylthiourea), $1 \times 10^{-5}$ mol/mol.Ag of chloroauric acid and 0.2 g/mol.Ag of nucleic acid were added, and optimal chemical sensitization was carried out at 50° C.

The form, size, and size distribution of the grains of the silver chlorobromide Emulsion (a) so obtained were determined from electron micrographs. The silver halide grains contained in Emulsion (a) were all cubic grains, the grain size was 0.52 μm, and the variation coefficient was 0.08. The grain size was represented by the average value of the diameters of the circles which had the same area as the projected areas of the grains, and the value obtained by dividing the standard deviation of the grain size by the average grain size was used for the variation coefficient of the grain size distribution.

Next, the halogen composition of the emulsion grains was determined by measuring the X-ray diffraction from the silver halide crystals. The diffraction angle from the (200) plane was measured in detail using a monochromatic $Cu_{k\alpha}$ line for the X-ray source. The diffraction line from a crystal in which the halogen composition is uniform gives a single peak, whereas the diffraction line from a crystal which has a local phase which has a different composition gives a complex peak corresponding to the respective compositions. It is possible to determine the halogen composition of the silver halide from which the crystals are made by calculating the lattice constants from the measured diffraction angles of the peaks. The results of the measurements made with silver chlorobromide Emulsion (a) provided in addition to the main peak for 100% silver chloride a broad diffraction pattern centered on 70% silver chloride (30% silver bromide) and extending to the 60% silver chloride (40% silver bromide) side.

Preparation of Sensitive Material (a)

A multi-layer color printing paper of which the layer structure is indicated below was prepared by establishing by coating following a corona discharge treatment on the surface of a paper support which had been laminated on both sides with polyethylene, a gelatin underlayer which contained sodium dodecylbenzene sulfonate, and then coating the various photographic structural layers. The coating liquids were prepared in the way indicated below.

Preparation of the First Layer Coating Liquid

Ethyl acetate (27.2 cc) and 4.1 grams each of the solvents (Solv-3) and (Solv-7) were added to 19.1 grams of the yellow coupler (ExY), 4.4 grams of colored image stabilizer (Cpd-1) and 0.7 grams of colored image stabilizer (Cpd-7). A solution was formed which was then emulsified and dispersed in 185 cc of a 10% aqueous gelatin solution which contained 8 cc of 10% sodium dodecylbenzenesulfonate to prepare an emulsified dispersion. On the other hand, an emulsion was prepared by adding the red sensitive sensitizing dye (Dye-1) indicated below to the silver chlorobromide Emulsion (a). The aforementioned emulsified dispersion and this emulsion were mixed together to prepare the first layer coating liquid of which the composition is indicated below.

The coating liquids for the second to the seventh layers were prepared using the same procedure as for the first layer coating liquid. Moreover, 1-oxy-3,5-dichloro-s-triazine, sodium salt, was used as a gelatin hardening agent for each layer.

Furthermore, Cpd-10 and Cpd-11 were added to each layer in such a way that the total amounts were 25.0 mg/m$^2$ and 50.0 mg/m$^2$, respectively. (Dye-1), (Dye-2) and (Dye-3) indicated below were used as sensitizing dyes for each layer.

(First Layer, Red Photosensitive Yellow Color Forming Layer)

(Dye 1)

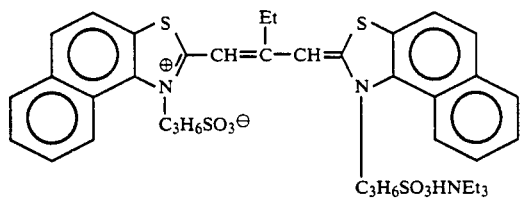

$1.0 \times 10^{-4}$ mol per mol of silver halide

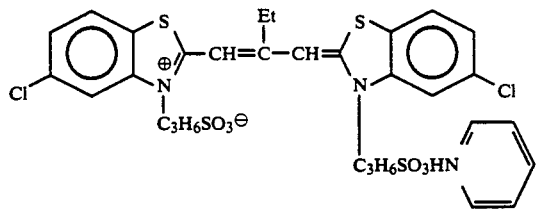

$1.0 \times 10^{-4}$ mol per mol of silver halide (Third Layer, Infrared Photosensitive Magenta Color Forming Layer)

(Dye-2)

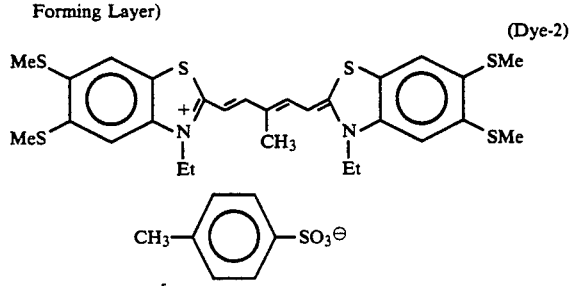

$5 \times 10^{-5}$ mol per mol of silver halide (Fifth Layer, Infrared Photosensitive Cyan Color Forming Layer)

(Dye-3)

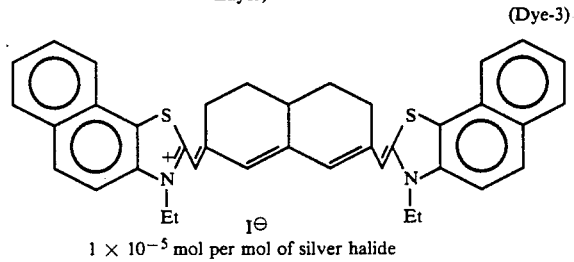

$1 \times 10^{-5}$ mol per mol of silver halide

Furthermore, 1-(5-methylureidophenyl)-5-mercaptotetrazole was added to the yellow, magenta and cyan color forming emulsion layers in amounts of $8.0 \times 10^{-4}$ mol per mol of silver halide.

The dyes indicated below were added to the non-photosensitive layers and dispersed uniformly within the film for anti-irradiation purposes:

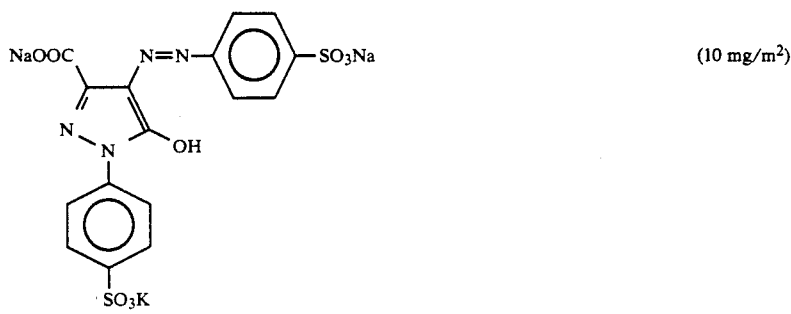

(10 mg/m$^2$)

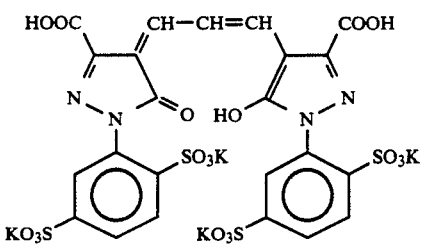
(10 mg/m²)
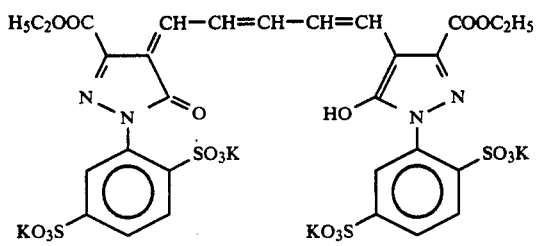
(40 mg/m²)
and
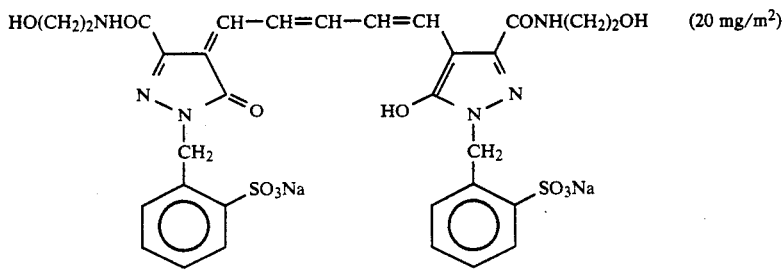
(20 mg/m²)
Dye-A
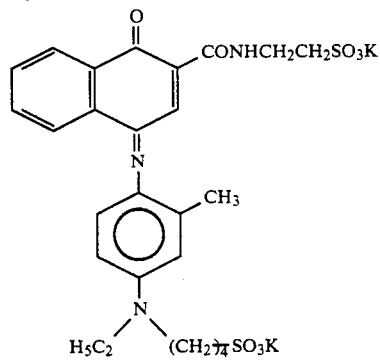
(20 mg/m²)
Dye-B
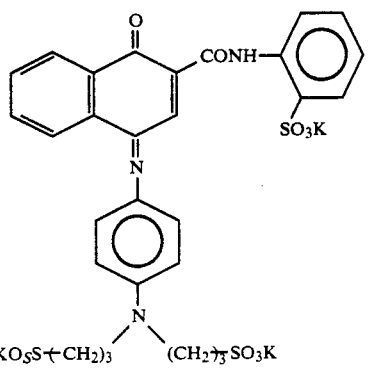
Dye-B, Dye-C, and the dyes of the present invention (I-2), (I-19), (I-20), (I-21) and (I-22), were dispersed instead of Dye-A to prepare sensitive Materials (b) to (h).

-continued

Dye-C

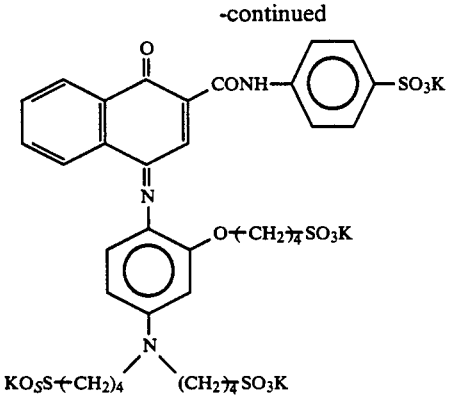

Layer Structure

The composition of each layer is indicated below. The numerical values indicate coated weights (g/m²). In the case of silver halide emulsions, the coated weight is shown as the calculated coated weight of silver.

Support

Polyethylene laminated paper
[White pigment (TiO₂) and blue dye (ultramarine) were included in the polyethylene on the first layer side]

| | |
|---|---|
| First Layer (Red Sensitive Yellow Color Forming Layer) | |
| The aforementioned silver chlorobromide Emulsion (a) | 0.30 |
| Gelatin | 1.22 |
| Yellow coupler (ExY) | 0.82 |
| Colored image stabilizer (Cpd-1) | 0.19 |
| Solvent (Solv-3) | 0.18 |
| Solvent (Solv-7) | 0.18 |
| Colored image stabilizer (Cpd-7) | 0.06 |
| Second Layer (Anti-color Mixing Layer) | |
| Gelatin | 0.64 |
| Anti-color mixing agent (Cpd-5) | 0.10 |
| Solvent (Solv-1) | 0.16 |
| Solvent (Solv-4) | 0.08 |
| Third Layer (Infrared Sensitive Magenta Color Forming Layer) | |
| Silver chlorobromide Emulsion (a) | 0.12 |
| Gelatin | 1.28 |
| Magenta coupler (ExM) | 0.23 |
| Colored image stabilizer (Cpd-2) | 0.03 |
| Colored image stabilizer (Cpd-3) | 0.16 |
| Colored image stabilizer (Cpd-4) | 0.02 |
| Colored image stabilizer (Cpd-9) | 0.02 |
| Solvent (Solv-2) | 0.40 |
| Fourth Layer (Ultraviolet Absorbing Layer) | |
| Gelatin | 1.41 |
| Ultraviolet absorber (UV-1) | 0.47 |
| Anti-color mixing agent (Cpd-5) | 0.05 |
| Solvent (Solv-5) | 0.24 |
| Fifth Layer (Infrared Sensitive Cyan Color Forming Layer | |
| Silver chlorobromide Emulsion (a) | 0.23 |
| Gelatin | 1.04 |
| Cyan coupler (ExC) | 0.32 |
| Colored image stabilizer (Cpd-2) | 0.03 |
| Colored image stabilizer (Cpd-4) | 0.02 |
| Colored image stabilizer (Cpd-6) | 0.18 |
| Colored image stabilizer (Cpd-7) | 0.40 |
| Colored image stabilizer (Cpd-8) | 0.05 |
| Solvent (Solv-6) | 0.14 |
| Sixth Layer (Ultraviolet Absorbing Layer) | |
| Gelatin | 0.48 |
| Ultraviolet absorber (UV-1) | 0.16 |
| Anti-color mixing agent (Cpd-5) | 0.02 |
| Solvent (Solv-5) | 0.08 |
| Seventh Layer (Protective Layer) | |
| Gelatin | 1.10 |
| Acrylic modified poly(vinyl alcohol) (17% modification) | 0.17 |
| Liquid paraffin | 0.03 |

(ExY) Yellow Coupler
A 1:1 mixture (mol ratio) of:

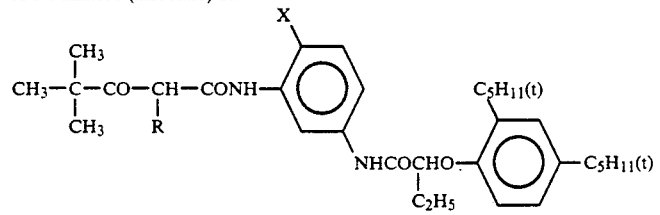

where

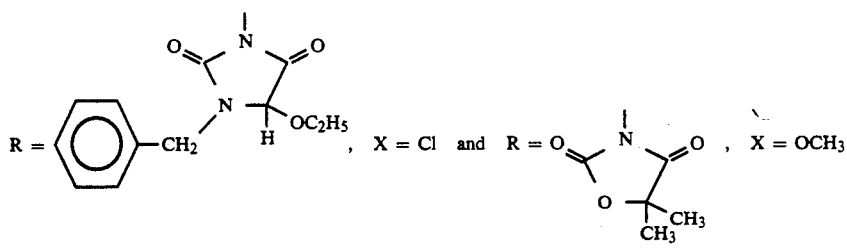
(ExM) Magenta Coupler
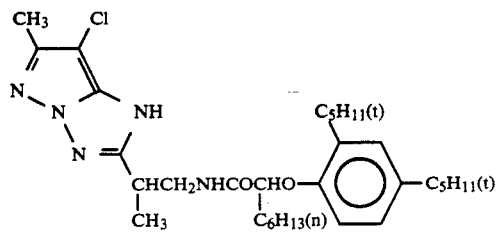
(ExC) Cyan Coupler
A 1:1 mixture (mol ratio) of:
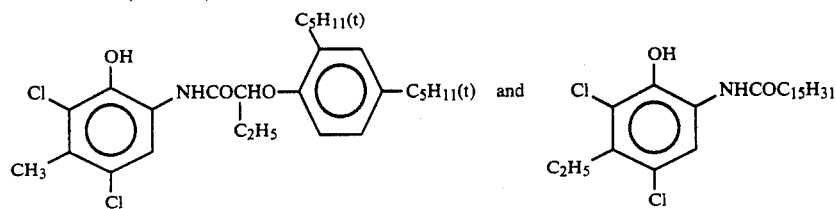
(Cpd-1) Colored Image Stabilizer
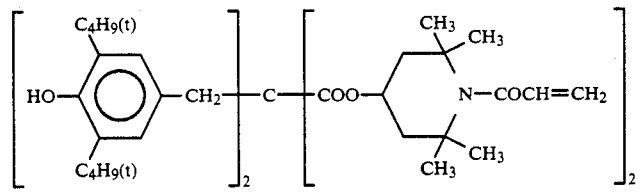
(Cpd-2) Colored Image Stabilizer
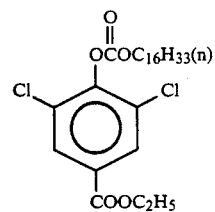
(Cpd-3) Colored Image Stabilizer
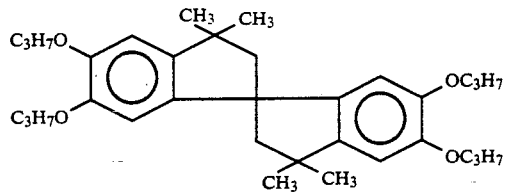
(Cpd-4) Colored Image Stabilizer
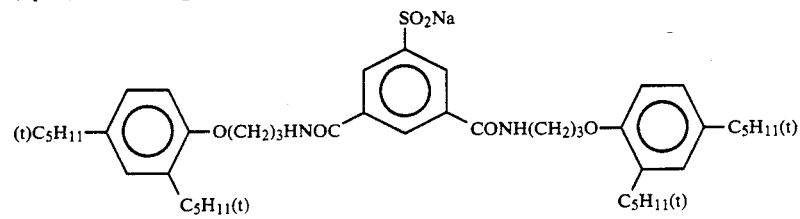
(Cpd-5) Anti-color Mixing Agent

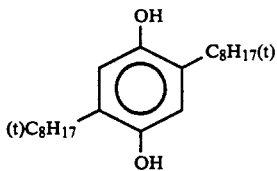
(Cpd-6) Colored Image Stabilizer
A 2:4:4 mixture (by weight) of:
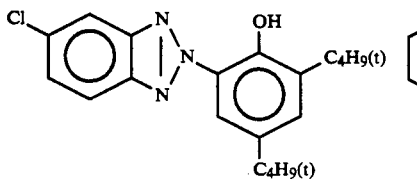 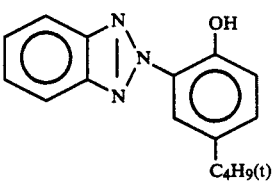 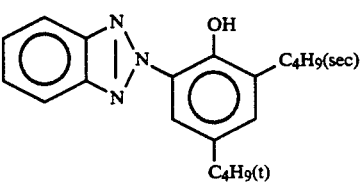
(Cpd-7) Colored Image Stabilizer
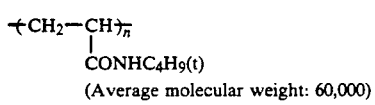
(Average molecular weight: 60,000)
(Cpd-8) Colored Image Stabilizer
A 1:1 mixture (by weight) of:
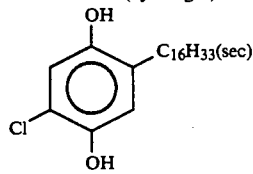 and 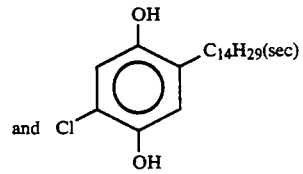
(Cpd-9) Colored Image Stabilizer
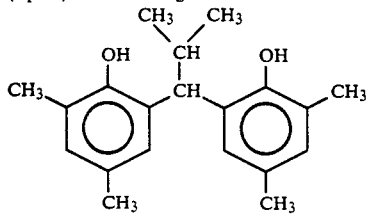
(Cpd-10) Fungicide
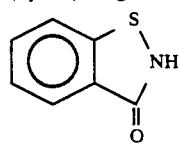
(Cpd-11) Fungicide
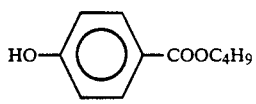
(UV-1) Ultraviolet Absorber
A 4:2:4 mixture (by weight) of:
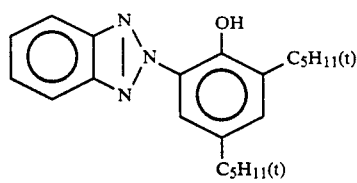 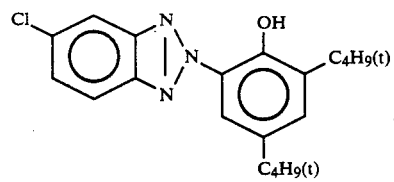 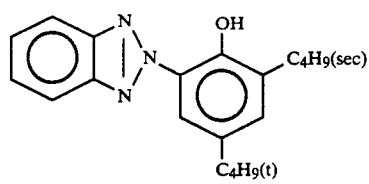
(Solv-1) Solvent
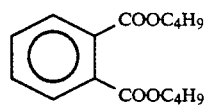
(Solv-2) Solvent
A 1:1 mixture (by volume) of:
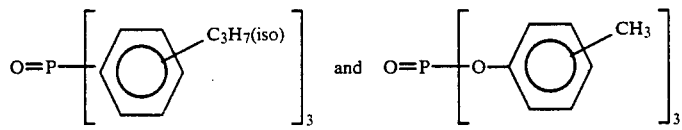
(Solv-3) Solvent    (Solv-4) Solvent

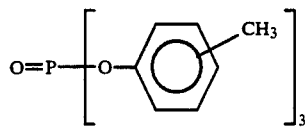

(Solv-5) Solvent

COOC$_8$H$_{17}$
|
(CH$_2$)$_8$
|
COOC$_8$H$_{17}$ (Solv-6) Solvent
An 80:20 mixture (by volume) of:

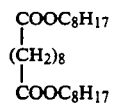 and C$_8$H$_{17}$CHCH(CH$_2$)$_7$COOC$_8$H$_{17}$
\\ /
O (Solv-7) Solvent
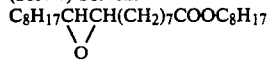

The compounds (Cpd-12) and (Cpd-13) shown below were added to the magenta photosensitive layer and the cyan photosensitive layer in amounts of $1.8 \times 10^{-3}$ mol and $2 \times 10^{-3}$ mol per mol of silver halide, respectively.

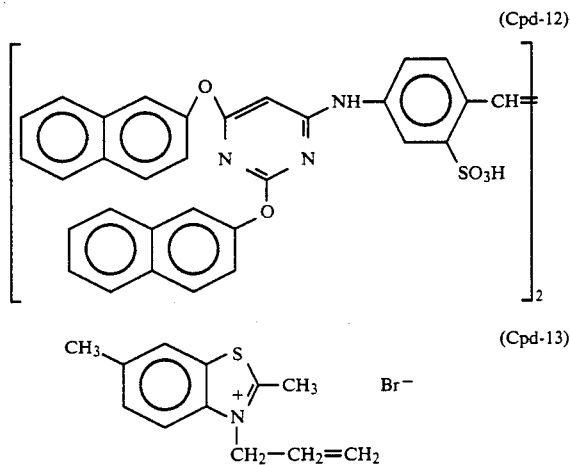

Evaluation of Storage Stability

The photosensitive materials shown in Table 3 which had been prepared in accordance with the method described above were stored for 2 days under conditions of 50° C., 80% humidity. Then their reflection absorption spectra were measured, and the fractional change in optical absorption at the peak absorption wavelength of each dye (absorbance after being left to stand at 50° C., 80% RH/absorbance before being left to stand at 50° C., 80% RH) was obtained and the results are shown in Table 3.

Evaluation of Decolorization

The samples shown in Table 3 were subjected to an image forming process as described below, and the reflection absorption spectrum of the white base part was measured in each case. The residual coloration due to the dyes was calculated by comparing the optical absorbance at the peak absorbance of the dye before and after the image forming process. The results are shown in Table 3.

The photosensitive materials which had been prepared were exposed using the exposing apparatus described below.

An AlGaInP semiconductor laser (oscillating wavelength about 670 nm), a GaAlAs semiconductor laser (oscillating wavelength about 750 nm), and a GaAlAs semiconductor laser (oscillating wavelength about 830 nm) were used. The apparatus was established in such a way that the laser light was made to scan by means of rotating polygonal bodies, and it was possible to make a sequential scanning exposure on a color printing paper which was being moved in the direction perpendicular to the scanning direction. The quantity of laser light was modulated and the exposure was controlled by means of a combination of a pulse width modulation system which modulated the quantity of light by varying the period of time for which electrical power was supplied to the semiconductor laser, and an intensity modulating system with which the quantity of light was modulated by changing the amount of power which was supplied. The scanning exposure was carried out at 400 dpi, and the average exposure time per picture element was about $10^{-7}$ seconds.

The development processing indicated below was carried out after exposure.

Development Processing A

The exposed samples were processed in a paper processor continuously (in a running test) using the processing operations and processing baths indicated below, until the system had been replenished to the extent of twice the color development tank capacity.

| | Processing Operation | | | |
|---|---|---|---|---|
| | Temperature (°C.) | Time (sec.) | Replenishment Rate* | Tank Capacity |
| Color Development | 35 | 45 | 161 ml | 2 liters |
| Bleach-fix | 30–35 | 45 | 215 ml | 2 liters |
| Rinse (1) | 30–35 | 20 | — | 1 liter |

-continued

| Processing Operation | | | | |
|---|---|---|---|---|
| | Temperature (°C.) | Time (sec.) | Replenishment Rate* | Tank Capacity |
| Rinse (2) | 30–35 | 20 | — | 1 liter |
| Rinse (3) | 30–35 | 20 | 350 ml | 1 liter |
| Drying | 70–80 | 60 | | |

*: Replenishment rate per square meter of photosensitive material. (A three tank counter flow system from rinse (3) → Rinse (1) was used)

The composition of each processing bath was as indicated below:

| | Tank Solution | Replenisher |
|---|---|---|
| Color developer | | |
| Water | 800 ml | 800 ml |
| Ethylenediamine-N,N,N',N'-tetramethylenephosphonic acid | 1.0 grams | 2.0 grams |
| Potassium bromide | 0.015 gram | — |
| Triethanolamine | 8.0 grams | 12.0 grams |
| Sodium chloride | 1.4 grams | — |
| Potassium carbonate | 25 grams | 25 grams |
| N-Ethyl-N-(β-methane-sulfonamidoethyl)-3-methyl-4-aminoaniline sulfate | 5.0 grams | 7.0 grams |
| N,N-Bis(carboxymethyl)-hydrazine | 4.0 grams | 5.0 grams |
| N,N-di(sulfoethyl)hydroxyl-amine mono-sodium salt | 4.0 grams | 5.0 grams |
| Fluorescent whitener (WHITEX 4B, made by Sumitomo Chemical Co., Ltd.) | 1.0 gram | 2.0 grams |
| Water to make | 1000 ml | 1000 ml |
| pH (25° C.) | 10.05 | 10.45 |
| Bleach-fix Bath (Tank Solution = Replenisher) | | |
| Water | 400 ml | |
| Ammonium thiosulfate (700 g/l) | 100 ml | |
| Sodium sulfite | 17 grams | |
| Ethylenediamine tetra-acetic acid, iron (III) ammonium salt | 55 grams | |
| Ethylenediamine tetra-acetic acid, di-sodium salt | 5 grams | |
| Ammonium bromide | 40 grams | |
| Water to make | 1000 ml | |
| pH (25° C.) | 6.0 | |
| Rinse Bath (Tank Solution = Replenisher) | | |
| Ion exchanged water (Calcium and magnesium both less than 3 ppm) | | |

EXAMPLE 2

An evaluation of decolorization was carried out with the sensitive materials used in Example 1 using the processing operations indicated below. The results obtained are shown in Table 3.

| Development Processing B Processing Operation | | | | |
|---|---|---|---|---|
| | Temperature (°C.) | Time (sec.) | Replenishment Rate* | Tank Capacity |
| Color Development | 35 | 20 | 60 ml | 2 liters |
| Bleach-fix | 30–35 | 20 | 60 ml | 2 liters |
| Rinse (1) | 30–35 | 10 | — | 1 liter |
| Rinse (2) | 30–35 | 10 | — | 1 liter |
| Rinse (3) | 30–35 | 10 | 120 ml | 1 liter |
| Drying | 70–80 | 20 | | |

*: Replenishment rate per square meter of photosensitive material. (A three tank counter flow system from rinse (3) → Rinse (1) was used)

The composition of each processing bath was as indicated below:

| | Tank Solution | Replenisher |
|---|---|---|
| Color Developer | | |
| Water | 800 ml | 800 ml |
| Ethylenediamine-N,N,N',N'-tetramethylenephosphonic acid | 1.5 grams | 2.0 grams |
| Potassium bromide | 0.015 gram | — |
| Triethanolamine | 8.0 grams | 12.0 grams |
| Sodium chloride | 4.9 grams | — |
| Potassium carbonate | 25 grams | 37 grams |
| 4-Amino-3-methyl-N-ethyl-N-(3-hydroxypropyl)aniline 2 p-toluenesulfonate | 12.8 grams | 19.8 grams |
| N,N-Bis(carboxymethyl)-hydrazine | 5.5 grams | 7.0 grams |
| Fluorescent whitener (WHITEX 4B, made by Sumitomo Chemical Co., Ltd.) | 1.0 gram | 2.0 grams |
| Water to make | 1000 ml | 1000 ml |
| pH (25° C.) | 10.05 | 10.45 |
| Bleach-fix Bath (Tank Solution = Replenisher) | | |
| Water | 400 ml | |
| Ammonium thiosulfate (700 g/l) | 100 ml | |
| Sodium sulfite | 17 grams | |
| Ethylenediamine tetra-acetic acid, iron (III) ammonium salt | 55 grams | |
| Ethylenediamine tetra-acetic acid, di-sodium salt | 5 grams | |
| Ammonium bromide | 40 grams | |
| Water to make | 1000 ml | |
| pH (25° C.) | 6.0 | |
| Rinse Bath (Tank Solution = Replenisher) | | |
| Ion exchanged water (calcium and magnesium both less than 3 ppm) | | |

TABLE 3

| Photosensitive Material | Dye | Amount Added (mol/m$^2$) | Fractional Dye Residue (%) | Fractional Residue (%) | | Remarks |
|---|---|---|---|---|---|---|
| | | | | Process A | Process B | |
| (a) | (A) | $2 \times 10^{-5}$ | 50.0 | 25 | 32 | Comparative Example |
| (b) | (B) | " | 60.3 | 12 | 16 | " |
| (c) | (C) | " | 72.3 | 3 | 5 | " |
| (d) | I-2 | " | 95.3 | 0 | 1 | This Invention |
| (e) | I-19 | " | 95.6 | 0 | 0 | " |
| (f) | I-20 | " | 98.8 | 0 | 0 | " |
| (g) | I-21 | " | 99.2 | 0 | 0 | " |
| (h) | I-22 | " | 99.3 | 0 | 0 | " |

As is clear from Table 3, in comparison with the known indoaniline dyes (JP-A-50-100116 and JP-A-2-259753), the dyes of the invention exhibit superior performance in terms of stability and decolorization. Furthermore, it was found that in comparison with the comparative dyes, the reduction in photographic speed and the deterioration in resolution were small.

While the invention has been described in detail and with reference to specific embodiments thereof, it will be apparent to one skilled in the art that various changes and modifications can be made therein without departing from the spirit and scope thereof.

What is claimed is:

1. A silver halide photographic photosensitive material comprising a support having thereon a layer which contains at least one dye represented by general formula (I):

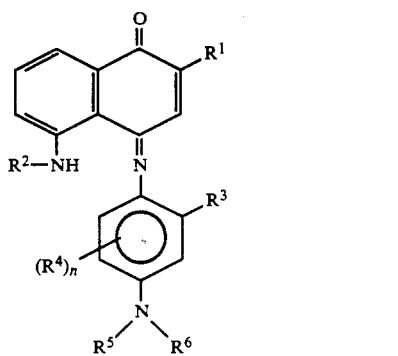

wherein, $R^1$ represents a hydrogen atom, a halogen atom, a sulfonic acid group, a carboxylic acid group or a CONHR, SO$_2$NHR, NHSO$_2$R, NHCOR or NHCONHR group, where R is an alkyl group, an aryl group or a heterocyclic group; $R^2$ represents a group represented by SO$_2$R, COR or CONHR, where R is an alkyl group, an aryl group or a heterocyclic group; $R^3$ and $R^4$ may be the same or different, and each represents a hydrogen atom, an alkyl group, an alkoxy group, a hydroxy group, an amino group or a halogen atom; $R^5$ and $R^6$ are the same or different, and each represents an alkyl group, an aryl group, an acyl group or a sulfonyl group; $R^5$ and $R^6$ may be joined together to form a five or six membered ring; $R^5$ and $R^6$ may be joined with the adjacent $R^4$ respectively to form five or six membered rings; n represents an integer of value 0 to 3; wherein there are at least three acidic substituent groups within the dye.

2. The silver halide photographic photosensitive material as in claim 1, further comprising a hydrophilic colloid layer which contains at least one dye according to general formula (I) in which $R^1$ is a CONHR group, where R represents an alkyl group, an aryl group or a heterocyclic group, $R^4$ is a hydrogen atom, and $R^5$ and $R^6$ are alkyl groups.

3. The silver halide photographic photosensitive material as in claim 2, wherein at least four acidic substituent groups are included in the dye.

4. The silver halide photographic photosensitive material as in claim 2, wherein at least five acidic substituent groups are included in the dye.

5. The silver halide photographic photosensitive material as in claim 1, wherein at least two of the acidic groups are carboxylic acid groups.

6. The silver halide photographic photosensitive material as in claim 1, wherein $R^1$ is CONHR.

7. The silver halide photographic photosensitive material as in claim 6, wherein R represents a 3,5-dicarboxyphenyl group or a 3,5-disulfophenyl group.

* * * * *